(12) United States Patent
Shimon

(10) Patent No.: US 11,408,979 B2
(45) Date of Patent: Aug. 9, 2022

(54) OPTICAL PHASED ARRAY FOCUS CONTROL FOR ACTIVE ILLUMINATED SWIR RANGE SELECTION

(71) Applicant: RAYTHEON COMPANY, Waltham, MA (US)

(72) Inventor: Philip T. Shimon, Torrance, CA (US)

(73) Assignee: RAYTHEON COMPANY, Waltham, MA (US)

( * ) Notice: Subject to any disclaimer, the term of this patent is extended or adjusted under 35 U.S.C. 154(b) by 46 days.

(21) Appl. No.: 14/603,877

(22) Filed: Jan. 23, 2015

(65) Prior Publication Data

US 2016/0216370 A1    Jul. 28, 2016

(51) Int. Cl.

| | | |
|---|---|---|
| *G01S 7/481* | (2006.01) | |
| *G02B 27/00* | (2006.01) | |
| *G01S 17/89* | (2020.01) | |
| *G01S 17/08* | (2006.01) | |
| *G01S 7/483* | (2006.01) | |
| *F41G 7/22* | (2006.01) | |
| *F41G 3/14* | (2006.01) | |

(52) U.S. Cl.
CPC ............ *G01S 7/4811* (2013.01); *F41G 3/145* (2013.01); *F41G 7/226* (2013.01); *F41G 7/2293* (2013.01); *G01S 7/483* (2013.01); *G01S 7/4814* (2013.01); *G01S 17/08* (2013.01); *G01S 17/89* (2013.01); *G02B 27/0087* (2013.01)

(58) Field of Classification Search
CPC .................................................. G01S 7/4811
USPC ....................................................... 250/353
See application file for complete search history.

(56) References Cited

U.S. PATENT DOCUMENTS

| | | |
|---|---|---|
| 5,336,216 A | 8/1994 | Dewey |
| 5,400,161 A | 3/1995 | Lambert, Jr. |
| 2009/0059101 A1 | 3/2009 | Wang et al. |

(Continued)

FOREIGN PATENT DOCUMENTS

AU    2013248208 A1    5/2014

OTHER PUBLICATIONS

McManamon et al., "Optical Phased Array Technology," IEEE, vol. 84, No. 2, pp. 268-298, Feb. 1996.*

(Continued)

*Primary Examiner* — David P Porta
*Assistant Examiner* — Carolyn Fin
(74) *Attorney, Agent, or Firm* — Lando & Anastasi, LLP

(57) ABSTRACT

Electro-optical sighting systems and methods are provided. One example includes a optical transmitter configured to emit an infrared beam along an optical path toward a target, a beam director positioned in the optical path and having a plurality of optical elements configured to direct the infrared beam and to collect reflected infrared radiation from reflection of the beam from the target, a focal plane array detector configured to receive reflected infrared radiation from the beam director, an optical phased array (OPA) positioned in the optical path between the optical transmitter and the beam director, and a controller operatively coupled to the OPA and configured to direct the OPA to defocus the infrared beam to broaden a field of view of the optical transmitter for active illumination, and focus the infrared beam to narrow the field of view of the optical transmitter for range determination and/or target designation.

14 Claims, 2 Drawing Sheets

(56) References Cited

U.S. PATENT DOCUMENTS

2010/0116886 A1    5/2010  Flowers
2011/0278360 A1   11/2011  Shi
2012/0044476 A1    2/2012  Earhart et al.

OTHER PUBLICATIONS

McManamon P F et al: "A Review of Phased Array Steering for Narrow-Band Electrooptical Systems", Proceedings of the IEEE, IEEE. New York, US, vol. 97, No. 6, Jun. 1, 2009 (Jun. 1, 2009), pp. 1078-1096.
Dorschner T A et al: "An Optical Phased Array for Lasers", IEEE International Symposium on Phased Array Systems and Technology, Oct. 15-18, 1996 (Oct. 15, 1996), pp. 5-10.
International Search Report and Written Opinion for PCT/US2015/061823 dated Feb. 29, 2016.

\* cited by examiner

OPTICAL PHASED ARRAY FOCUS CONTROL FOR ACTIVE ILLUMINATED SWIR RANGE SELECTION

BACKGROUND

Optical systems have a wide variety of applications, such as range finding, target designation, and active illumination. A range finding optical system typically determines distance to a target by emitting a laser pulse and collecting energy reflected from that target. For example, a range finding system can determine the time difference between emission of the laser pulse and collection of the reflected energy, and translate that time difference into a distance (range) to the target. Such systems can use the Doppler Effect to judge whether the target is moving away from or towards the range finding system. In target designation, the system illuminates a target for a non-collocated receiver (e.g., another system some distance away). Target designation and range finding systems typically require a narrow laser field of view to maximize range. In particular, the field of view can be affected by the closest operational range requirement and the pointing accuracy of the optical system. In contrast, active illumination systems typically require a wide field of view. Active illumination systems use reflected short wave infrared (hereinafter "SWIR") light to image a scene. For example, in many instances there is an absence of light necessary to properly view a target (e.g., at night or when the target is inside caves, tunnels, enclosed buildings, etc.). Instead of illuminating the target with light that is detectable by the human eye, active illumination systems emit an SWIR laser pulse, and collect energy reflected from the target and the surrounding environment. The reflected energy is used to construct a visual representation of the target and the surrounding area. As such, in an active illumination optical system it is advantageous to have a wide field of view.

SUMMARY OF INVENTION

Aspects and embodiments are directed to optical systems and methods for supporting range finding, target designation, and active illumination capabilities. In particular, aspects and embodiments are directed to a controllable optical phased array having continuous adjustable focus and defocus capabilities.

According to various aspects and embodiments, an electro-optical sighting system is provided. The system includes a first optical transmitter configured to emit an infrared beam along an optical path toward a target, a beam director positioned in the optical path and having a plurality of optical elements configured to direct the infrared beam and to collect reflected infrared radiation from reflection of the beam from the target, a focal plane array detector configured to receive collected reflected infrared radiation from the beam director, an optical phased array positioned in the optical path between the first optical transmitter and the beam director; and a controller operatively coupled to the optical phased array and configured to direct the optical phased array to defocus the infrared beam to broaden a field of view of the first optical transmitter for active illumination, and focus the infrared beam to narrow the field of view of the first optical transmitter for range determination and/or target designation.

In one embodiment, the system further includes a beam splitter configured to direct the reflected infrared radiation collected by the beam director onto the focal plane array detector. In a further embodiment, the controller is coupled to the focal plane array detector and further configured to generate images of a scene including the target from the reflected infrared radiation directed onto the focal plane array detector. In another embodiment, the controller is further configured to direct the optical phased array to defocus the infrared beam to broaden the field of view of the first optical transmitter, and focus the infrared beam to narrow the field of view in response to analysis of the generated images of a scene including the target. In another embodiment, the controller is further configured to direct the optical phased array to defocus the infrared beam to broaden the field of view of the first optical transmitter, and focus the infrared beam to narrow the field of view in response to receiving external input from one or more external sources.

In one embodiment, first optical transmitter includes a short wave infrared active illumination laser. In a further embodiment, the focal plane array detector is configured to sense light in a wavelength range of 1.0 µm to 2.0 µm. In one embodiment, the system further includes a second optical transmitter configured to emit a second infrared beam along the optical path. In a further embodiment, the second optical transmitter includes a target designation laser. In another embodiment, the second optical transmitter includes a range finding laser.

In one embodiment, the controller further comprises a user interface configured to receive a user focus command to defocus the infrared beam to broaden the field of view of the first optical transmitter, and to focus the infrared illumination beam to narrow the field of view of the first optical transmitter.

According to another aspect, a method of operating an electro-optical sighting system is provided. The method can include the acts of emitting an infrared beam from a first optical transmitter along an optical path through an optical phased array toward a target, focusing the infrared beam onto the target with the optical phased array to define a first field of view of the first optical transmitter, receiving reflected infrared radiation from reflection of the beam from the target at a focal plane array, and responsive to receiving reflected infrared radiation, re-focusing the infrared beam with the optical phased array onto the target to define a second field of view of the first optical transmitter.

In one embodiment, the method can further include the act of receiving external input from one or more external sources. In a further embodiment, the method can further include the act of re-focusing the infrared beam with the optical phased array onto the target to define a second field of view of the first optical transmitter responsive to receiving external input.

In one embodiment, the first optical transmitter includes an active illumination laser, and re-focusing the infrared beam with the optical phased array onto the target further includes broadening the first field of view to increase active illumination of the target by the infrared beam.

In one embodiment, first optical transmitter includes a target designation laser, and re-focusing the infrared beam with the optical phased array onto the target further includes ascertaining an infrared beam target indicator size and maintaining the infrared beam target indicator size.

In accordance with one embodiment, the first optical transmitter includes a range finding laser, and re-focusing the infrared beam with the optical phased array onto the target further includes narrowing the first field of view to maximize emission distance of the infrared beam.

In a further embodiment, the method can further include the act of emitting a second infrared beam from a second optical transmitter along the optical path through the optical phased array toward the target.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Conventional optical systems were typically limited to one of range finding, target designation, or active illumination functions due to field of view limitations. As used herein, "field of view" refers to the beam-width or illumination area of a transmitted beam. For example, a tactical laser having a narrow field of view to designate a target may not provide sufficient illumination to effectively illuminate the target and surrounding area for active illumination operations. Furthermore, fixed narrow field of view systems suffer from beam divergence when the distance to the target is dramatically increased. For example, a target indicator may remain relatively unnoticeable at a distance of 200 m; however, at a distance of 12,000 m, as a result of beam divergence, the indicator increases in size dramatically, disrupting the accuracy and secrecy of the indicator. Recent attempts to remedy these issues require mechanically interchangeable lenses that increase the weight of the optical system. This can be of particular concern when the optical system is attached to an aircraft. Furthermore, mechanically interchangeable lenses require fine tuning and precision control which can be time consuming and impractical when a target or the optical system is in motion.

Aspects and embodiments are directed to optical systems and methods for supporting range finding, target designation, and/or active illumination operations. In particular, aspects and embodiments are directed to a controllable optical phased array having continuous adjustable focus and defocus abilities to switch between optical system operations or maintain a target indicator size, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
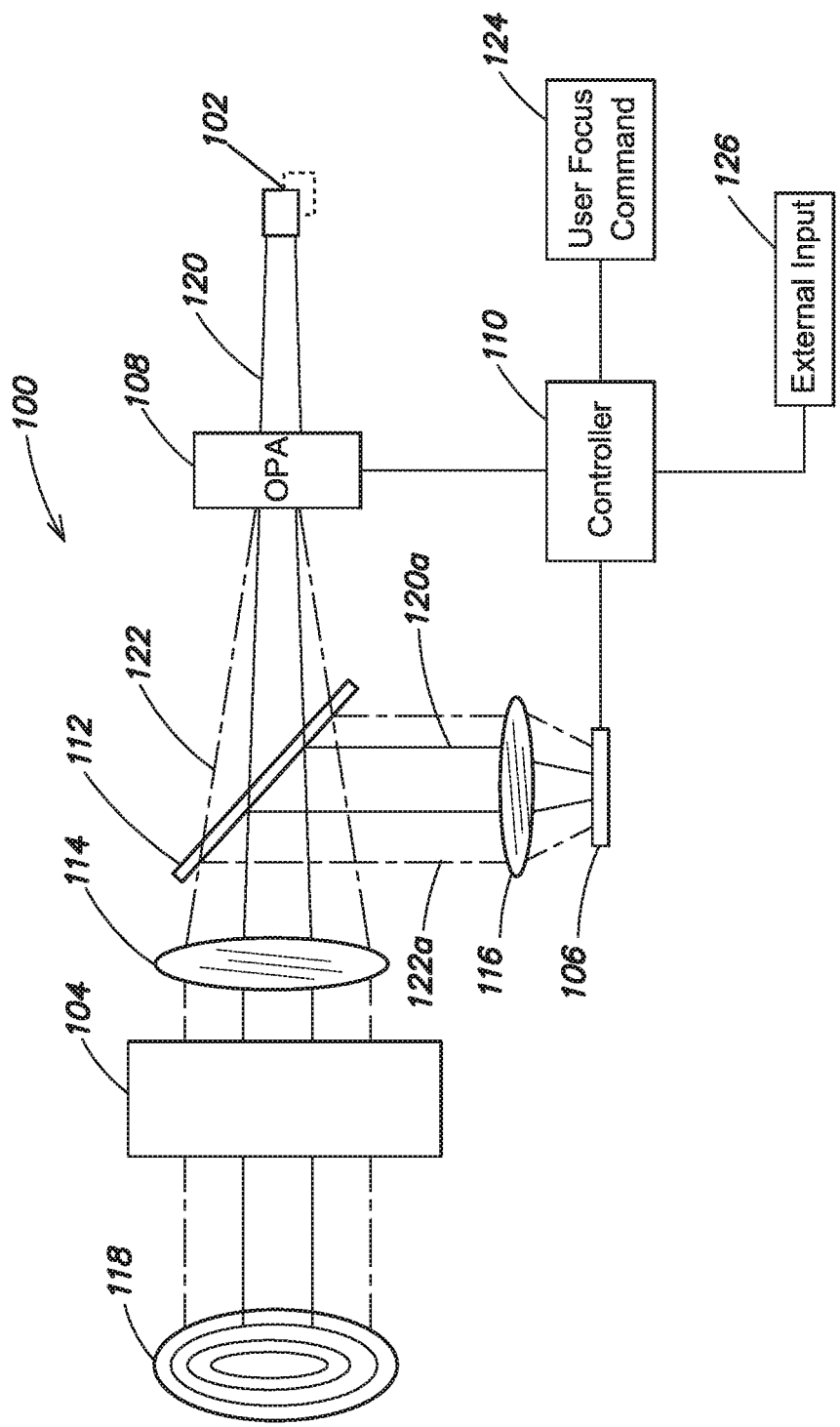
FIG. 1 is a diagrammatical cross-sectional view of one example of an optical system according to aspects of the present invention.

Referring now to FIG. 1, there is illustrated one example of an electro-optical optical sighting system having a controllable optical phased array, such as may be used in a fighter-mounted pod or other aerial system, for example. The electro-optical sighting system, referenced generally as optical system 100, includes an optical transmitter 102 configured to emit a laser beam (e.g., infrared beam 120) along an optical path toward a target 118, and a detector 106 configured to receive reflected infrared radiation 120a comprised of reflections of the emitted infrared beam 120 from the target 118 and optionally the area surrounding the target. In certain examples, the optical transmitter 102 may include any one or more of an SWIR active illumination laser, a target designation laser, and a range-finding laser, as discussed further below. In one example, the detector 106 is a two-dimensional focal plane array imaging detector; however, other types of detectors or multiple detectors may be used. For example, focal plane array detector 106 may be a large format focal plane array, for example, a 1,280 by 1,024 pixel array having 40 µm pixels. In other embodiments, the detector may include a small 512 by 512 array, or other sized array. The focal plane array detector 106 is sensitive to light in the infrared wavelength range, and may be selected to be sensitive to infrared light in a range encompassing the emission wavelength(s) of the optical transmitter 102, for example, including the wavelength range from about 1 µm to 2.0 µm. Although a small and a large array are offered by way of example, in various embodiments the focal plane array detector 106 can include other detectors as is understood in the art.

The optical system 100 further includes a beam director 104 positioned in the optical path and configured to direct the infrared beam 120 toward the target, and to collect and direct the reflected infrared radiation 120a from the target 118 toward the detector 106. The beam director 104 may include one or more lenses and/or mirrors. In one example, the beam director 104 includes a focal telescope, and optionally, a beam-steering assembly that maintains pointing of the infrared beam 120 towards the target 118. In addition to the beam director 104, or alternatively as part of the beam director 104, the optical system 100 may include collimating and/or fixed focusing optics 114 and 116. The optics 114 may include one or more mirrors or lenses configured to correct, focus, and/or collimate the infrared beam 120 and the reflected infrared radiation 120a. The optics 116 may include one or more lenses and/or mirrors configured to focus the reflected infrared radiation 120a onto the detector 106, and optionally to provide correction for optical errors, such as coma, astigmatism, chromatic aberrations, etc. A beam splitter 112 may be positioned in the optical path and configured to separate the reflected infrared radiation 120a from the infrared beam 120, and more specifically, to transmit the infrared beam 120 toward the beam director 104 and to direct the reflected infrared radiation 120a toward the detector 106.

Still referring to FIG. 1, the optical system 100 further includes an optical phased array (OPA) 108 positioned in the optical path between the optical transmitter 102 and the beam director 104, and a controller 110 operatively coupled to the optical phased array 108 and, optionally, the detector 106. As discussed in more detail below, the optical phased array 108 is configured to focus or defocus the infrared beam 120 passing through the optical phased array 108, thereby changing the beamwidth or "field of view" (FOV) of the optical transmitter 102. The optical phased array 108 may be controlled by a controller 110, which may optionally receive focus/defocus commands from a user (represented at block 124), as discussed further below. For example, as shown in FIG. 1, the optical phased array 108 may be controlled to defocus the infrared beam 120 so as to broaden the FOV of the optical transmitter 102, as indicated by dashed lines 122. The broadened infrared beam 122 may be directed to the target 118 via the beam director 104, and reflections 122a of the broadened infrared beam 122 may be received at the detector 106. In this manner, the same optical transmitter 102, detector 106, and optical train (represented by beam director 104, optics 114, and optics 116) may be used to achieve both narrow FOV and wide FOV imaging on demand, which may be highly desirable and useful in certain applications, as discussed above.

In one embodiment, the optical transmitter 102 includes a SWIR active illumination laser. For example, in a particular embodiment, the SWIR active illumination laser emits one or more pulses of light having a wavelength in the range of 1 μm-2 μm. Although various types of lasers capable of operating in the short wave infrared spectral region may be employed, the SWIR active illumination laser of one embodiment can include a 1.5 μm solid state Erbium Yb-glass or a 1.5 μm Raman shifted Yb-YAG planar waveguide device, depending on the desired pulse format. In a further embodiment, the SWIR active illumination laser can include a controller capable of coordinating operations associated with the SWIR active illumination laser.

In another embodiment, the optical transmitter 102 includes a target designation laser. The target designation laser is configured to direct a beam or series of pulses at the intended target 118. During operation, an operator of the target designation laser directs the beam to a general region where the target 118 is located. In various embodiments, the target designation laser further includes a tracking system configured to search the designated area and receive information regarding the designated area and objects in the designated area. For example, this information can include a profile of the area and objects. Based on the information, the target designation laser can "mark" an object in the area as the target 118. In other embodiments, the beam or series of pulses emitted by the target designation laser is reflected from the target 118 and detected by a seeker. In this manner, the target designation laser is used to indicate to an outside source the location of the target 118 based on the location of the target designation laser infrared beam target indicator.

Although various types of target designation lasers may be employed, the target designation laser of one embodiment can include a 1.06 Nd-YAG diode pumped solid state laser. In certain embodiments, the target designation laser can further include a controller capable of coordinating operations associated with the target designation laser.

In other embodiments, the optical transmitter 102 includes a range finding laser. The range finding laser is configured to determine the distance to the target 118 by emitting at least one laser pulse toward the target 118. In one embodiment, distance to the target 118 can be calculated based on the time of flight principle, which estimates the distance to the target 118 based on the time it takes the emitted laser pulse to return to the optical system. The optical system 100 then determines a coordinate that corresponds to the location associated with energy reflected from the target 118. Although various types range finding lasers may be employed, the laser of one embodiment can include a 1.06 Nd-YAG diode pumped solid state laser. In additional embodiments, the range finding laser can include a Laser Detection and Ranging ("LADAR") system. Accordingly, a LADAR system permits a user to image the target while determining distance. In a further embodiment, the range finding laser can include a controller capable of coordinating operations associated with the laser.

In one embodiment, the optical transmitter 102 can include a laser configured to provide multi-mission support. For instance, the optical transmitter can include a laser configured to provide target designation, range finding, and active illumination operations. Accordingly, the multi-mission optical transmitter is configured to generate different waveforms required for the different operations.

As discussed above, and with continuing reference to FIG. 1, according to one embodiment, the optical system 100 includes an optical phased array 108 positioned in the optical path between the optical transmitter 102 and the beam director 104. The optical phased array 108 may include at least one liquid crystal optical phased array, and may include a plurality of stacked optical phased arrays. Each optical phased array comprises a metallic compound responsive to application of an electrical signal (e.g., a current or voltage). Application of the electrical signal to the optical phased array readjusts the physical positioning of the liquid crystals in the optical phased array, thereby changing the refractive qualities of the optical phased array 108. Therefore, controlled application of electrical signals to a stacked formation of optical phased arrays can focus or defocus the infrared beam 120 passing through the optical phased array 108.

As also discussed above, in various embodiments, the optical system 100 further includes a controller 110 operatively coupled to the optical phased array 108 and optionally coupled to the focal plane array detector 106, and configured to control the optical phased array 108 to focus and/or defocus the infrared beam 120. The controller 110 may be any type of processor, multiprocessor, or controller. The controller 110 may be connected to other system components, including the optical phased array 108 and the focal plane array detector 106 by an interconnection element. The interconnection element enables communications, including instructions and data, to be exchanged between system components such as the optical phased array 108 and the focal plane array detector 106. The controller 110 may be further connected to a memory and a data storage element. The memory stores a sequence of instructions coded to be executable by the controller 110 to control the optical phased array 108. Thus, the memory may be a relatively high performance, volatile, random access memory such as a dynamic random access memory (DRAM) or a static memory (SRAM). However, the memory may include any device for storing data, such as a disk drive or other nonvolatile storage device.

In one embodiment, the controller 110 is configured to apply an electrical signal (e.g., a current or voltage) to the optical phased array 108 to defocus the infrared beam 120 to broaden the field of view of the optical transmitter 102 (as indicated by dashed lines 122) for active illumination applications. In another embodiment, the controller 110 is configured to apply an electrical signal to the optical phased array 108 to focus the infrared beam 120 to narrow a field of view of the optical transmitter 102 for range determination and target designation applications. In another embodiment, the controller 110 is configured to apply varying electrical signals in order to maintain a specified infrared beam 120 target indicator size even as the distance to the target 118 changes. As such, the use of a processor controlled optical phased array permits a tactical laser (e.g., range finding laser, target designation laser, active illumination laser) to provide multi-mission support. Furthermore, the optical phased array 108 provides for continual dynamic adjustment without the necessity of mechanically interchangeable optical elements.

In another embodiment, the controller 110 can also include one or more interface devices (not shown) such as input devices, output devices, or combination input/output devices. Interface devices may receive input or provide output. For example, in an embodiment, the controller 110 includes a user interface for adjusting the characteristics of the optical phased array 108 in response to a user focus command 124. As used herein, the user focus command 124 can include any focal instruction directed by the user of the optical system 100. For instance, a user of the optical system 100 may elect an active illumination function and instruct the controller 110 to apply an electrical signal to the optical phased array 108 to defocus the infrared beam 120 to broaden the field of view. In another example, the user may select a target designation function to instruct the controller 110 to apply an electrical signal to the optical phased array 108 to narrow the field of view for range finding or target designation techniques.

In one embodiment, the controller 110 can be further configured to direct the optical phased array 108 to defocus the infrared beam 120 to broaden the field of view, and/or focus the infrared beam 120 to narrow the field of view in response to receiving external input 126 from one or more external sources. In particular, the controller 110 can be configured to receive information such as altitude, location, and directional information from one or more sensors. For example, using Digital Terrain Elevation Data ("DTED") information, such as target position and system position, target range can be estimated without use a range finding laser.

In various embodiments, the controller 110 can be further configured to generate images of a scene, including the target 118, from the reflected infrared radiation (120a and 122a) received by the focal plane array detector 106. In this regard, the optical phased array 108, the focal plane array detector 106, and the controller 110 can function as a feedback loop. For example, the controller 110 can: generate an image of the scene illuminated by processing the reflected infrared radiation (120a and 122a) received by the focal plane array detector 106, determine whether the field of view should be increased and decreased based on the generated image, and send a corresponding electrical signal to the optical phased array 108 to implement a focal change to increase or decrease the field of view. This technique may also be particularly useful during range finding operations. Based on the image generated, the controller 110 can be configured to determine whether the optical phased array 108 should focus or defocus the beam to maintain the desired size of the infrared beam target indicator on the target 118, and automatically control the optical phased array 108 to maintain the desired size.

In another embodiment, the electro-optical sighting system as discussed herein can further include a second optical transmitter (shown in ghost lines in FIG. 1) configured to emit an infrared beam along the optical path. In various embodiments, the second optical transmitter can include a target designation laser, a range finding laser, an active illumination laser, or any other laser as discussed herein. In various embodiments, the second optical transmitter is of a different variety than the first optical transmitter 102. In this regard, the optical phased array 108 enables the optical sighting system 100 to support two separate and different optical transmitters. For example, the optical system 100 may include a target designation laser and an active illumination laser. As previously discussed, these lasers require different fields of view as a result of the manner in which they operate. The optical phased array 108 offers quick and continuous interchangeability of the laser's respective infrared beams without the deficiencies of mechanical interchangeable lenses. In a further embodiment, the controller 110 can automatically control the optical phased array 108 in response to selection or activation of one of the two optical transmitters or received external input. In still another embodiment, the controller 110 can wait for instructions from the user of the optical system 100 before controlling the optical phased array 108.

Figure 2:
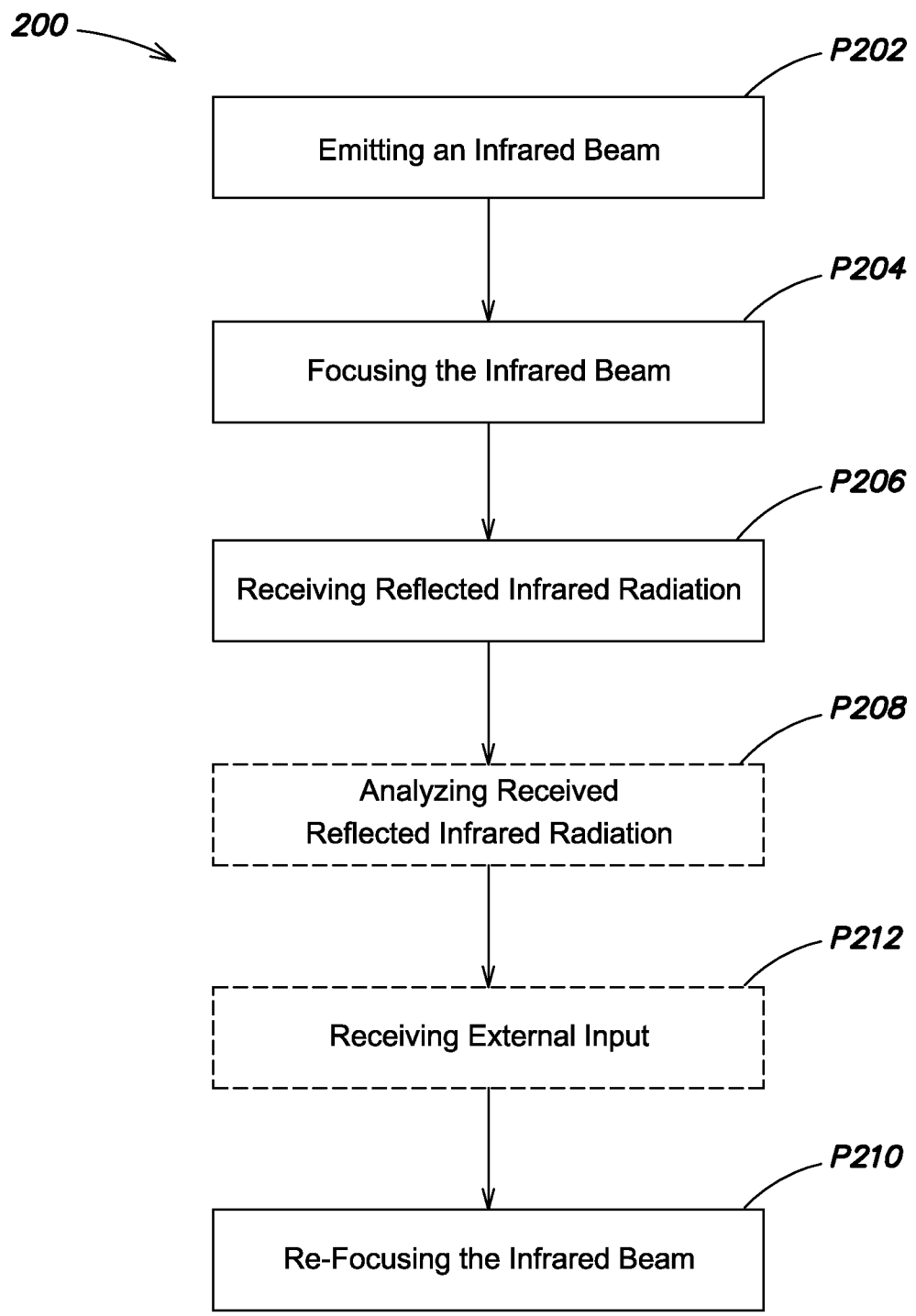
FIG. 2 is a process flow diagram showing an example of a method for operating the optical system according to aspects of the present invention.

Referring now to FIG. 2, a method of operating an electro-optical sighting system, such as electro-optical system 100 described above with reference to FIG. 1, is shown. According to various embodiments, the method 200 can include:

P202: Emitting an infrared beam from a first optical transmitter along an optical path through an optical phased array toward a target. The first optical transmitter, such as optical transmitter 102 as described herein with reference to FIG. 1, can include a SWIR active illumination laser, a target designation laser, or a range finding laser. In a further embodiment, the method can further include emitting an infrared beam from a second optical transmitter along the optical path through the optical phased array toward a target. In various embodiments, the second optical transmitter is of a variety different from the first optical transmitter. As discussed above with reference to FIG. 1, the second optical transmitter can include a target designation laser, a range finding laser, an active illumination laser (e.g., SWIR active illumination laser), or any other laser as discussed herein. Although described herein as including a first and a second optical transmitter for a first and a second mission (e.g., active illumination and target designation), in various embodiments the system can include a single optical transmitter configured to generate different waveforms required for different operations and accordingly provide multi-mission support.

P204: Focusing the infrared beam onto the target with the optical phased array to define a first field of view of the first optical transmitter. In one embodiment, the first field of view can be defined responsive to a controller provided optimal setting. For example, a lookup table within the controller may provide the optimal starting position for the desired mission (e.g., the initial field of view for the range finding missions may be different than that for active illumination missions). The optical phased array, such as optical phased array 108 in FIG. 1, includes at least one liquid crystal optical phased array and may include a plurality of stacked optical phased arrays. Each optical phased array comprises a metallic compound responsive to application of an electrical current. Application of an electrical signal (e.g., current or voltage) to one of the optical phased arrays readjusts the physical positioning of the liquid crystals in the optical phased array changing the refractive qualities of the optical phased array. Therefore, controlled application of an electrical signal to a stacked formation of optical phased arrays can focus or defocus the infrared beam passing through the optical phased array. As such, in various embodiments, the method 200 can further include controllably applying an electrical signal (e.g., current or voltage) to the optical phased array.

P206: Receiving reflected infrared radiation comprised of reflections of the infrared beam from the target at a focal plane array.

In one embodiment, receiving reflected infrared radiation from reflection of the beam from the target at a focal plane array further includes analyzing the collected reflected infrared radiation (shown optionally as ghost box P208). In various embodiments, analyzing the reflected infrared radiation can include generating images of a scene including the target from the reflected infrared radiation directed onto the focal plane array. For example, as discussed above, in response to receiving reflected infrared radiation, the controller may generate images of the scene and objects the infrared beam is reflected from and review those images to determine whether the field of view should be increased or decreased. For example, based on the image(s) generated, the controller can be configured to determine whether the optical phased array should focus or defocus the beam to maintain the desired size of the infrared beam target indicator.

In another embodiment, the method can include receiving external input from one or more external sources (shown optionally as ghost box 212 in FIG. 2). In particular, the controller can be configured to receive information such as altitude, location, and directional information from one or more sensors. Based on the information received, the controller can be configured to determine whether the optical phased array should focus or defocus the beam. For example, using Digital Terrain Elevation Data ("DTED") information, such as target position and system position, target range can be estimated without use of the range finding laser. While shown in method 200 as additionally and optionally including P212, in additional embodiments, the method 200 may include receiving external input and may not include analyzing the reflected infrared radiation. Accordingly, the external input, by itself, may be used to determine the second field of view. In such an embodiment, the processor is configured to analyze the external input to determine the second field of view.

In yet another embodiment, both received reflected infrared radiation and external input may be used in concert (shown optionally as ghost boxes P208 and P212) to determine whether to focus or defocus the optical phased array. In one such embodiment, the controller may be configured to receive the infrared radiation and external input from each source, analyze the infrared radiation and the external input, and accordingly determine whether the optical phased array should be focused, defocused, or maintained at the current focal condition.

P210: Responsive to receiving the reflected infrared radiation, or receiving the external input, re-focusing the infrared beam with the optical phased array onto the target to define a second field of view. In one embodiment, the method includes applying an electrical signal (e.g., current or voltage), via the controller, to the optical phased array to defocus the infrared beam to broaden the first field of view of the optical transmitter for active illumination techniques to define the second field of view. In another embodiment, the method can include applying an electrical signal to the optical phased array, via the controller, to focus the infrared beam to narrow the first field of view of the optical transmitted for range determination and target designation techniques to define the second field of view. In this embodiment, the second field of view can be narrow to maximize the emission distance of the infrared beam. In yet another embodiment, the method can include, applying varying electrical signals, via the controller, in order to maintain an infrared beam target indicator size. As discussed above in one embodiment, refocusing the infrared beam may optionally be performed responsive to receiving reflected infrared radiation, receiving external input, and/or receiving a focus command received from a user. For example, the user may elect an active illumination function to instruct the controller to apply an electrical signal to the optical phased array to defocus the infrared beam to broaden the first field of view to define the second field of view. In another example, the user may select a target designation function to apply an electrical signal to the optical phased array to narrow the first field of view to define the second field of view for target designation techniques. As such, a feedback, external input, or user controlled optical phased array enables a tactical laser (e.g., range finding laser, target designation laser, active illumination laser) to provide multi-mission support.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An electro-optical sighting system comprising:
   a short wave infrared active illumination laser configured to emit a first infrared beam along an optical path toward a target;
   a target designation laser configured to emit a second infrared beam along the optical path toward the target to direct an infrared beam target indicator onto the target;
   a beam director positioned in the optical path and having a plurality of optical elements configured to direct at least one of the first infrared beam and the second infrared beam, and to collect reflected infrared radiation from reflection of the at least one of the first infrared beam and the second infrared beam from the target;
   a focal plane array detector configured to receive collected reflected infrared radiation from the beam director;
   an optical phased array positioned in the optical path between the short wave infrared active illumination laser and the beam director, the optical phased array being further positioned in the optical path between the target designation laser and the beam director; and a controller operatively coupled to the optical phased array and configured to direct the optical phased array to defocus the first infrared beam to broaden a field of view of the short wave infrared active illumination laser for active illumination, and wherein the controller is further configured to direct the optical phased array to focus the second infrared beam to narrow a field of view of the target designation laser for target designation.

2. The system of claim 1, further comprising a beam splitter configured to direct the reflected infrared radiation collected by the beam director onto the focal plane array detector.

3. The system of claim 2, wherein the controller is coupled to the focal plane array detector and further configured to generate an image including the target from the reflected infrared radiation directed onto the focal plane array detector.

4. The system of claim 2 wherein, the beam splitter is positioned in the optical path between the beam director and the optical phased array and is further configured to reflect the collected reflected infrared radiation from the beam director towards the focal plane array detector.

5. The system of claim 1, wherein the focal plane array detector is configured to sense light in a wavelength range of 1.0 μm to 2.0 μm.

6. The system of claim 1, wherein the controller further comprises a user interface configured to receive a first user focus command to defocus the first infrared beam to broaden the field of view of the short wave infrared active illumination laser, and wherein the user interface is configured to receive a second user focus command to focus the second infrared beam to narrow the field of view of the target designation laser.

7. The system of claim 1, wherein the optical phased array includes at least one liquid crystal optical phased array positioned to refract the first infrared beam and the second infrared beam.

8. The system of claim 7, wherein in directing the optical phased array, the controller is configured to provide an electrical signal to the at least one liquid crystal optical phased array to adjust the refraction of the at least one liquid crystal optical phased array.

9. A method of operating an electro-optical sighting system comprising:

emitting a first infrared beam from a short wave infrared active illumination laser along an optical path through an optical phased array toward a target;

focusing the first infrared beam onto the target with the optical phased array to define a first field of view of the short wave infrared active illumination laser;

receiving reflected infrared radiation from reflection of the first infrared beam from the target at a focal plane array;

re-focusing the first infrared beam with the optical phased array onto the target to define a second field of view of the short wave infrared active illumination laser, in response to receiving the reflected infrared radiation;

emitting a second infrared beam from a target designation laser along the optical path through the optical phased array toward the target to direct an infrared beam target indicator onto the target; and focusing the second infrared beam onto the target with the optical phased array to define a first field of view of the target designation laser.

10. The method of claim 9, further comprising:

positioning a beam splitter in the optical path between a beam director and the optical phased array;

collecting the reflected infrared radiation with the beam director; and the beam splitter reflecting the collected reflected infrared radiation from the beam director towards the focal plane array.

11. The method of claim 9, further comprising receiving external input from one or more external sources.

12. The method of claim 9, wherein re-focusing the first infrared beam with the optical phased array onto the target further comprises broadening the first field of view of the short wave infrared active illumination laser to increase active illumination of the target by the first infrared beam.

13. The method of claim 9, wherein focusing the first infrared beam onto the target with the optical phased array includes refracting the first infrared beam.

14. The method of claim 13, wherein focusing the second infrared beam onto the target with the optical phased includes refracting the second infrared beam.

* * * * *